Aug. 30, 1960  F. J. WYTHE  2,950,571
OPERATING MECHANISM FOR GLASS FEEDERS
Filed April 12, 1957  7 Sheets-Sheet 2

INVENTOR
FREDERICK J. WYTHE
BY Bates & Willard
ATTORNEYS

FIG.7

VOLTAGE OUTPUT CHARACTERISTIC OF LINEAR SYNCHRO

SYNCHRO VOLTAGE
WITH MODIFIED DRIVE

-------- BASIC
———— MODIFICATION

INVENTOR
FREDERICK J. WYTHE
BY Bates + Willard
ATTORNEYS

Aug. 30, 1960    F. J. WYTHE    2,950,571
OPERATING MECHANISM FOR GLASS FEEDERS
Filed April 12, 1957    7 Sheets-Sheet 5

INVENTOR
FREDERICK J. WYTHE
BY Bates & Willard
ATTORNEYS

Aug. 30, 1960    F. J. WYTHE    2,950,571
OPERATING MECHANISM FOR GLASS FEEDERS
Filed April 12, 1957    7 Sheets-Sheet 7

FIG_15

FIG_16

FIG_17

INVENTOR
FREDERICK J. WYTHE
BY Bates & Willard
ATTORNEYS

United States Patent Office 2,950,571
Patented Aug. 30, 1960

2,950,571

OPERATING MECHANISM FOR GLASS FEEDERS

Frederick J. Wythe, Hebron, Conn., assignor to Emhart Manufacturing Company, Hartford, Conn., a corporation of Delaware Filed Apr. 12, 1957, Ser. No. 652,623

17 Claims. (Cl. 49—55)

This invention relates to improvements in glass feeders for producing charges of molten glass of predetermined weights and shapes appropriate for the molds of associate forming machines.

Such charges range in weight from a fraction of an ounce to twenty-five pounds or more. A forming machine operation for the making of very heavy glass articles may require the supply feeder to produce the charges desired at a low production rate, possibly as few as four per minute. At the opposite end of the production range, as for the making by automatic machinery of very small glass articles, the feeder employed may be required to produce charges at a rate exceeding one hundred per minute.

Because of shortcomings inherent in the structure and mode of operation of existing feeders, a plurality of specifically different such feeders may be required for use at different times if the glass articles to be made are of widely different weights. Thus, one feeder may be adapted to provide charges varying in weight only in the lower part of the weight range, another feeder may be adapted to provide charges only within an intermediate part of the range, and a third feeder may be adapted to provide charges only in the upper part of such range.

A general object of the present invention is to provide a feeder having operating means such that the same feeder can produce charges of any weight throughout the entire range of weights now in demand in the glass industry, as from a fraction of an ounce up to twenty-five pounds and at a speed varying from a minimum of four charges per minute up to a maximum well above the maximum that can be accommodated by any presently known commercial forming machine.

A glass feeder typical of those now in commercial use essentially comprises a refractory container, generally termed a "spout," having a glass discharge outlet passage in its bottom covered by a feed body of molten glass. This food body is of substantial depth and its surface is kept at a substantially constant level in the container by inflow thereto of molten glass from a forehearth channel. The latter is operatively connected to a glass melting tank furnace.

Molten glass from the feed body tends to flow downwardly by gravity and head pressure through the bottom outlet passage to and through an orifice or twin orifices at the bottom of such passage. Removable and replaceable orifice rings are provided to determine whether the issuance of glass is from a single orifice or from twin orifices and also to vary as desired and within a considerable range the size of the orifice or orifices. Glass issuing from each such orifice is accumulated in suspension therefrom. A charge is obtained from each suspended mold charge mass by cutting through it at a plane close to that of the orifice, a feeder shear mechanism being employed for that purpose.

The particular artificial shape of each such charge is mainly determined by the motion of a vertically reciprocable refractory feeder plunger which extends downwardly in the spout so that its lower end is in the spout bottom outlet passage close to the orifice or orifices when the plunger is at the lower end of its downward stroke. A feeder plunger may be any of a number of different sizes, ranging in diameter from 2 or 2½ inches to possibly 7 or 7½ inches. The weight of a small size plunger may be in the order of 10 to 15 lbs. while the largest size plunger may weight 85 lbs or slightly more.

In most of the feeders in use today, the feeder plunger operating means is wholly mechanical. A rotating cam acts through a follower and an assembly of levers and mechanical links to raise a vertically movable arm from which the plunger is suspended, whereby to cause a predetermined upstroke of the plunger during a part of each cycle of rotation of the cam and to permit the plunger and its suspending arm to move downwardly by gravity to effect a downstroke of the plunger during another part of the cam's cycle of rotation. Mechanical adjustments are provided in the lever and linkage assembly to vary vertically the position of the path of the reciprocatory movements of the lower end of the plunger in relation to the orifice or orifices at the bottom of the spout outlet passage and/or the amplitude of the plunger strokes without changing the lower limit thereof, all without change of the actuating cam. By interchange of cams, the particular reciprocatory movements of the plunger can be varied within a considerable range.

The U.S. Patent No. 1,760,254 of May 27, 1930 discloses a feeder having a plunger movably supported and operated by wholly mechanical means substantially as hereinbefore described.

Because of the weight to be sustained and moved vertically, the components of the plunger supporting and operating lever and linkage system necessarily must be strong enough to be suitable for the largest and heaviest plunger to be used in a particular feeder. An undesirably heavy load thus is imposed on the feeder cam and more particularly on the driver of such cam, which customarily is an electric motor, when the feeder is constructed so as to be suitable with the use of relatively large and heavy plungers, as required for the production of relatively heavy charges. If a relatively small size plunger should be substituted for a heavier plunger in this operating set-up, the plunger operations would be effected through unnecessarily heavy and cumbersome mechanical means. Conversely, if lighter weight mechanical means operable by the cam to support and move a relatively light plunger should be provided, the arrangement might not be sturdy enough to support and operate the relatively heavy plunger, at least not without undesirable vibration and instability and a high rate of wear on the relatively moving connected parts.

The operation of this wholly mechanical type of plunger supporting and operating mechanism essentially depends on continuous contact of the cam follower with the rotating cam and difficulty in maintaining this contact, which is present to some degree even when the plunger is being reciprocated at a moderate speed, is greatly increased when operations are speeded up.

In the representative feeder of the aforesaid U.S. Patent No. 1,760,254 and in most of the feeders in actual use at the present time, the shear mechanism also is operated by wholly mechanical means having a phase-adjusting mechanical connection with the feeder plunger operating means. Furthermore, the feeder plunger operating means has a mechanical operating connection with means for controlling the operations of the associate glassware forming machine.

The mechanical assemblies for operating the feeder plunger and shear mechanism and the control means of the associate forming machine are of necessity mounted entirely or in substantial part on the feeder spout. This places many of the elements of these assemblies in locations where they are difficult to replace, repair or adjust. Since they are required to operate in an atmosphere of high temperature and close to highly heated refractory parts, effective lubrication of bearings and other relatively moving, contacting parts presents a substantial problem. The presence of the mechanical plunger operating means on the spout and the mechanical connection thereof with the feeder shear mechanism restricts choice of the angular position of the latter on the spout and this in turn restricts choice of the particular position of the associate forming machine. These restrictions are undesirable, especially when the feeder is to be used for the feeding of molten glass through twin orifices at the bottom of the spout outlet.

It therefore is an object of the present invention to provide feeder operating means which will be free from the aforesaid shortcomings and features of disadvantage of the wholly mechanical operating means of existing feeders.

Included in this more general object is to provide feeder operating means having a control mechanism which need not be located on the feeder spout but instead may be placed at any convenient location where it will be readily accessible and away from any undesirably high temperature environment. In addition to other advantages, this feature enables use of the feeder to feed borosilicate or other high temperature glass without danger of damage to mechanical parts.

To attain the foregoing and other objects which hereinafter will appear, the invention provides an electrically responsive pressure fluid motor means, preferably hydraulic, mechanically connected to the feeder plunger operatively to support and reciprocate the latter in relation to the orifice or orifices at the bottom of the spout outlet passage. An electromechanical control mechanism which, together with a housing or case therefor, may be termed the "mechanism box" of the feeder is linked electrically to an electronic amplifier which in turn is connected electrically with the electrically responsive pressure fluid means. The mechanism box includes a synchro receiver having a synchronized driven connection with a synchro transmitter. The synchro transmitter may be driven from a rotating shaft of the forming machine that is to be served by the feeder.

The synchro receiver acts through suitable motion transmitting means to drive an electromechanical transducer which produces a basic electrical signal related to a desired plunger motion and being equivalent at any given instant to the desired plunger position. A plunger position sensing device, which also may be an electromechanical transducer, is provided and is operatively connected to the plunger operating means so as to produce an electrical signal which will vary in amplitude the same as the plunger motion and at any given instant will be equivalent to the actual plunger position. This second electrical signal may be combined in the mechanism box with the basic signal. An error signal will result from any difference between the basic signal and the feed-back signal from the plunger and will be amplified and fed to the electrically responsive plunger operating mechanism to effect repeated cycles of plunger movements, each of which conforms to a predetermined pattern.

The feeder shear mechanism preferably is also an electrically responsive pressure fluid (hydraulic) operated mechanism and the mechanism box may include means operated by the synchro receiver to produce suitably timed electrical impulses which are fed to the shear mechanism to provide the desired glass cutting operations of the latter. Suitable known other forms of feeder shear mechanisms and control means may, however, be employed.

The mechanism box includes conveniently manipulable adjustments for varying the phase relation between the feeder plunger motions and the glass cutting operations of the shear mechanism, for varying the position vertically of the path of reciprocatory movements of the plunger in relation to the orifice or orifices at the bottom of the outlet passage of the feeder spout and for varying the amplitude of the plunger strokes and hence the speed at which they are being effected.

The operative connections of the mechanism box of the feeder of the present invention with the mechanisms for reciprocating the feeder plunger and for operating the feeder shears, respectively, and with the associate forming machine are all electrical. This mechanism box may therefore be positioned at any suitable or preferred location without thereby imposing any limitation on the positions of these mechanisms or of any of them. The removal of the mechanism box and mechanical adjuncts from the feeder spout will leave the space beneath and at the sides of the spout clear of obstruction to angular adjustment of the shear mechanism from the front of the spout rearwardly along either side thereof so that a wide range of angular shearing positions is possible. The associate forming machine can be located at various angles to the feeder spout and this will be of particular advantage in a shop set-up in which the feeder is to produce twin charges or so-called "double gobs" for the molds of the forming machine.

The mechanism box of the invention is not subjected to any appreciable external load or force and hence may be relatively small in size and light in weight and still be adapted for relatively wear-free use to control the operations of the hydraulic mechanisms which directly operate feeder plungers and shears to form and sever charges of the largest and smallest usable sizes and weights, selectively, and at relatively low speeds or at speeds as high as can be usefully employed at the present time.

Feeders having hydraulic or other fluid pressure provisions for operating the feeder plungers and/or the shears have been previously proposed but none of which I am aware has been designed for operation under the control of an electromechanical mechanism box or of any other control means of the character and mode of functioning or productive of the advantages hereinbefore described of the mechanism box of the present invention.

In the mechanism box, the electromechanical transducer which produces the basic electrical signal has one part movable with respect to another part and yields an output voltage varying with the position of that one part according to a predetermined function. This function may be selected to correspond with a basic cam shape. The transducer is driven by a varying speed driver in such fashion that the basic shape of the output voltage is modified to correspond with a desired cam shape. Means are also provided to permit adjustment of the manner and extent of variation of the speed of the driver to allow change in the wave shape of the transducer output voltage to correspond to differently shaped cams. The plunger motion that is obtained in the operation of the feeder when this form of mechanism box is employed is like that of the plunger of the cam controlled wholly mechanically operated conventional feeder but no actual cam need be used. Also, the functions of a large, theoretically infinite, number of differently shaped cams can be used selectively by reason of the simulation of cams.

In another form of the mechanism box, the movable part of the electromechanical transducer is oscillated about its axis repeatedly by varying driving means which includes a small removable and replaceable cam having a track of the desired contour and with which the shape of the output voltage corresponds. The plunger motion may be changed when this form of mechanism box is used by interchange of cams.

These two specifically different forms of control mechanisms are shown in the accompanying drawings and are described in detail later on in this specification. Electromechanical control means of specifically different other constructions and operations may be used without departing from the spirit of the invention, it only being essential that such control mechanism should produce an electrical signal related to the plunger motion desired and equivalent at any given instant to the desired plunger position.

Figure 1:
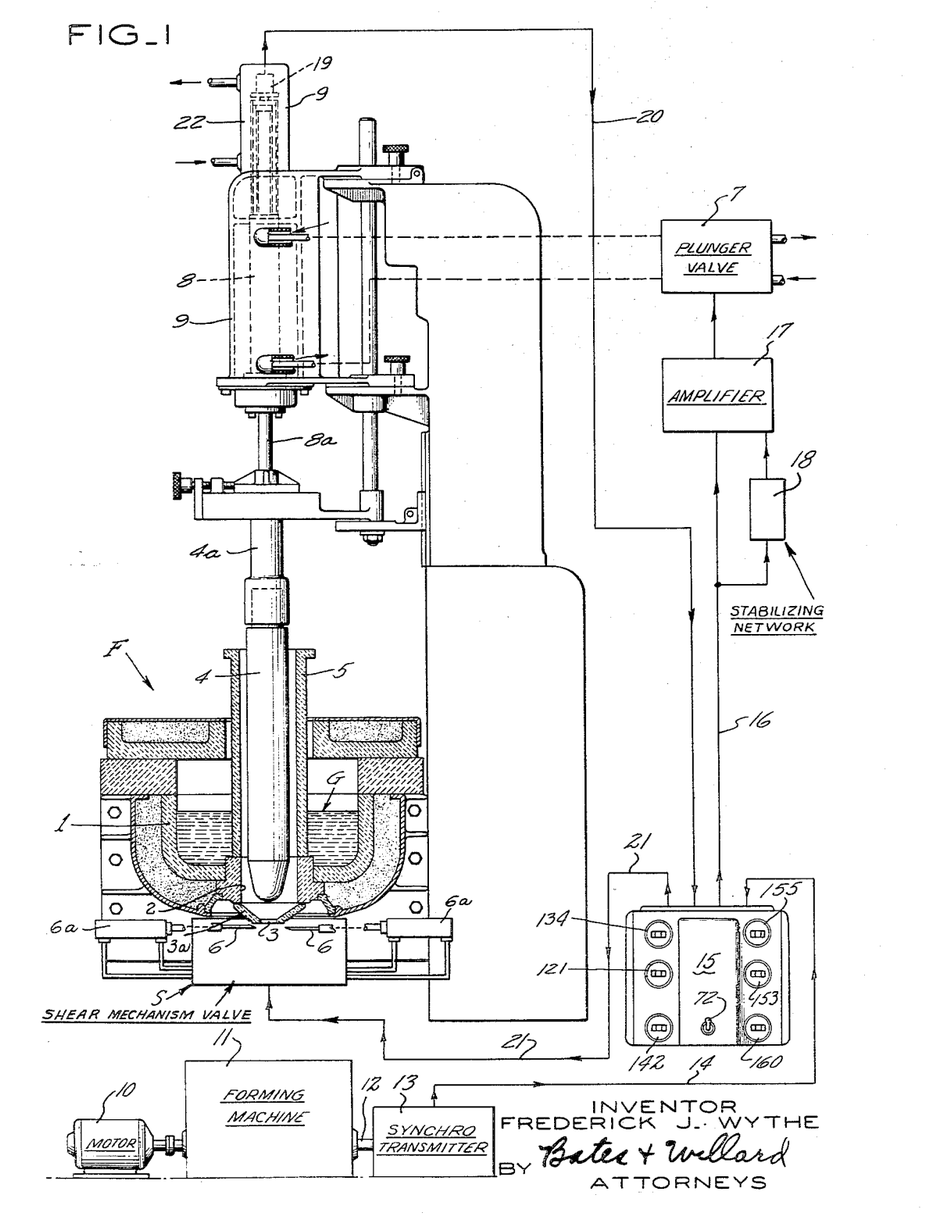
Fig. 1 is an essentially schematic view of a glass feeder having operating means in accordance with the invention and arranged to be driven from an associated forming machine.

Referring first to Fig. 1, a molten glass feeder, generally designated F, comprises a refractory spout 1 containing a feed body of molten glass G from which glass will tend to flow by gravity and head pressure to and through a vertical bottom outlet passage 2 and an orifice 3 in a removable orifice ring 3a at the bottom of that passage when a flow regulating vertical refractory tube 5 has been raised from the flow-preventing position shown to a predetermined distance vertically above the upper end of the then glass submerged outlet passage. A feeder plunger 4 is reciprocable vertically with its tip in the glass in the outlet passage to aid in controlling the formation of successive suspended mold charge masses of molten glass that has issued from the orifice 3. A mold charge will be severed from each such suspended mass by co-acting blades 6—6 which are operated by hydraulic motors 6ª, 6ª controlled by an electrically-responsive shear mechanism valve "S." The plunger motion is effective in the known manner to determine the particular artificial shape that the mold charges will have as thus obtained by periodic glass cutting operations of the feeder shears. These charges are appropriate for delivery to the molds (not shown) of an associate forming machine, designated 11, and for formation by such machine into particular articles of glassware or the like.

The plunger 4 is reciprocated by hydraulic means including a plunger valve 7 which controls the supply of fluid from an appropriate source (not shown) to a hydraulic motor 8 (see also Fig. 2) which lowers and raises the plunger. The hydraulic motor is cooled by water passing from a source (not shown) through a surrounding spaced casing or jacket 9. The plunger 4 is detachably fastened by a plunger chuck 4a to the lower end of a depending motor piston rod 8a and the motor is located well above the zone of high temperature next to the feeder spout cover.

Power for operation of the apparatus is furnished by an electric motor 10 which drives the forming machine 11, whose output shaft 12 drives the synchro transmitter or generator 13. The forming machine 11 is of conventional form and need not be more fully described in this application. Suffice it to say that drive of the synchro transmitter from the shaft 12 of the forming machine provides for the proper synchronization between the forming machine and operation of the feeder as hereinafter will be explained.

The output of the synchro transmitter is an electrical voltage which is supplied through a set of conductors indicated schematically at 14 to a mechanism box 15. The mechanism box has a pair of outputs, one of which is indicated schematically at 16, and which consists of an electrical voltage which is supplied to a servo amplifier 17. A system stabilizing network 18 is also provided. The output of the servo amplifier 17 is used to control the electro-hydraulic plunger valve 7.

In order to provide for feed back control of the plunger, an electromechanical transducer 19 is controlled by the position of the plunger to generate an electrical output voltage varying with that position. The output of the transducer is supplied through conductors indicated schematically at 20 to the mechanism box 15 in which it is combined with a locally-generated voltage. The combined voltage is supplied by the mechanism box to the servo amplifier 17 over conductors 16.

The second output of the mechanism box 15 is conducted through lines indicated schematically at 21 to the shear mechanism S which in the illustrative assembly is an electro-hydraulic unit of any suitable known or preferred kind.

Figure 2:
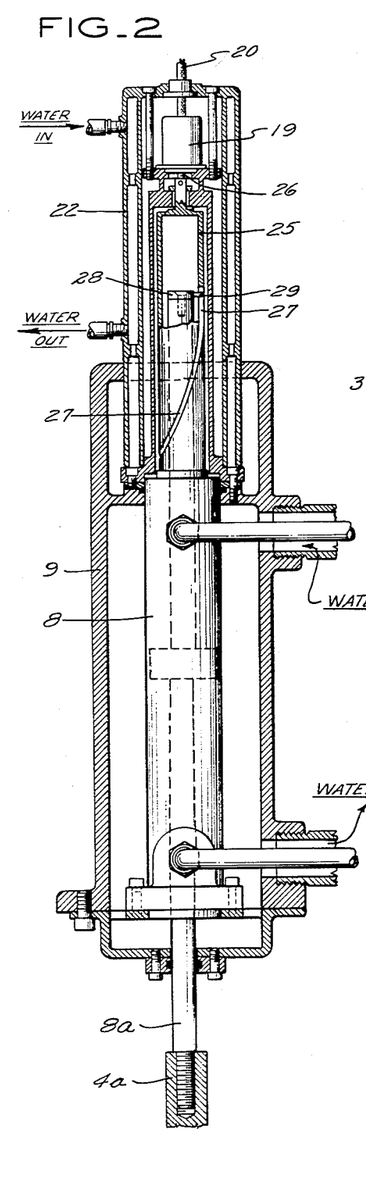
Fig. 2 is an enlarged, partly sectional, elevational view of a portion of the plunger-operating hydraulic motor and connected plunger-position sensing mechanism of the glass feeder.

Referring to Fig. 2, the reciprocatory motions of the plunger 4 are converted into rotational motion of the transducer 19 through a sleeve 25 which is attached to one end of the shaft 26 of the transducer and which has a helically-shaped slot 27 extending along its length. The upper end of the piston rod of the hydraulic motor 8 is labeled 28 in the figure and carries a projecting pin 29 which projects into the slot 27. As the plunger 4 moves up and down, the pin 29 moves with it, thus moving the sleeve 25 in arcuate or rotational fashion, so that the shaft of the transducer 19 is oscillated angularly with respect to its casing. A water cooled jacket or hollow casing 22 is provided for cooling of the transducer 19 and of the assembly of elements for mounting it on the plunger motor and operatively connecting it with the motor piston rod.

The transducer 19 may be of the synchro type and have an output voltage varying with and proportional to the angular position of the rotor.

As has been indicated, the rotation of the shaft 12 of Fig. 1 is transmitted to the mechanism box 15 through a synchro channel, including synchro transmitter or generator 13. In order to provide higher accuracy of the synchro system, a gear step-up is used between the shaft 12 and the transmitter or generator 13, and a corresponding step-down is employed between the receiver motor and the remaining elements of the feeder control mechanism. However, this gear arrangement allows the synchro receiver motor to assume a plurality of locked-in positions with respect to the generator, the number being determined by the ratio of the synchro speed to the speed of the input shaft. In order to insure that the synchro receiver motor shaft is locked-in at the same angular position as the generator shaft, the apparatus of the invention includes means for synchronizing the synchro generator and motor shafts together. This apparatus includes, referring to Figs. 3 and 4, a cam 30 driven by the generator and controlling the position of a follower arm 31. The follower arm 31 is pivoted between its ends to the shaft 32 of a solenoid 33.

Figure 4:
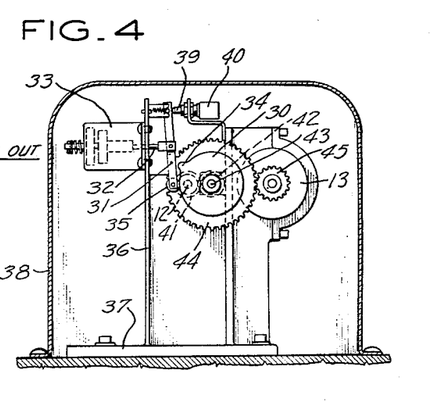
Fig. 4 is a front side elevational view of the synchro transmitter of Fig. 3.

The cam 30 has one operative portion or projection 34 which is arranged to strike a roller 35, Fig. 4, mounted at one end of the follower arm when the follower arm has been positioned by the solenoid 32. The other end of the follower arm is yieldingly urged toward a vertically-extending mounting member 36 of the base 37 of the transmitter box 38. This end of the follower is designed to control the position of the plunger 39 of a microswitch 40.

Figure 3:
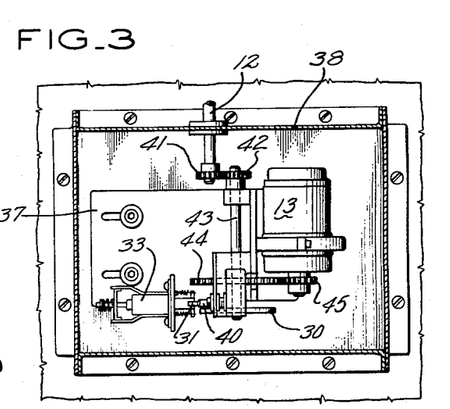
Fig. 3 is a top plan view of the synchro transmitter of the apparatus, with the casing shown in section.

The generator rotor is driven from the shaft 12 through a gearing arrangement including a spur gear 41 which meshes with a gear 42 mounted on a stub shaft 43, Fig. 3. Shaft 43 carries a gear 44, Figs. 3 and 4, which meshes with a drive gear 45 mounted on the shaft of the generator. Cam 30 is also mounted on shaft 43.

Figure 5:
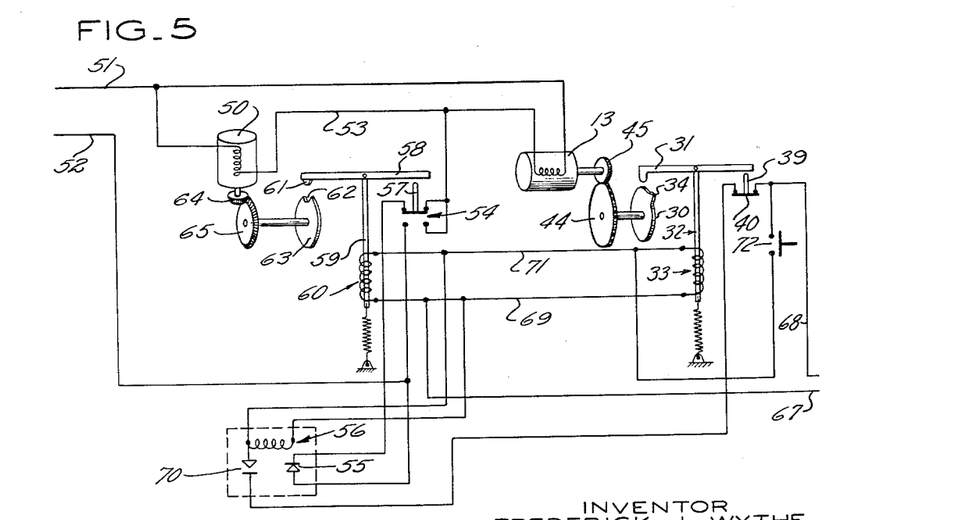
Fig. 5 is a schematic view, showing the transmitter and receiver of the synchro system and the mechanism for synchronizing the receiver with the transmitter.

Referring now to Fig. 5, showing the electrical connections of the synchro system and the synchronizing apparatus therefor, the rotors of the synchro generator 13 and the motor 50 are supplied with energizing voltage from a source of suitable amplitude and frequency (not shown) through conductors 51 and 52. The conductor 51 is connected to both of the synchro rotors, but the conductor 52 is connected to a common rotor conductor 53 only through a switch or relay. The switch referred to is a microswitch 54, of the double-throw type. The conductor 53 is connected to one of the contacts of each of the normally-open pair and the normally-closed pair of contacts of the microswitch 54, while the conductor 52 is connected to the other contact of the normally-open pair. The other contact of the normally-closed pair of the switch is connected through the normally-closed contacts 55 of a relay 56 to conductor 52.

The position of the actuating plunger 57 of the microswitch 54 is controlled by a follower arm 58 pivoted between its ends to the plunger 59 of a solenoid 60 and having one end provided with a projection 61 which is adapted to cooperate with the detent 62 of a cam 63. The cam 63 is driven by the rotor of the synchro motor 50 through gears 64 and 65.

The solenoids 33 and 60, and the relay 56, are provided with operating voltage from a suitable source (not shown) through a pair of conductors labeled 67 and 68. Conductor 67 is connected to a common line 69 which is directly connected to one side of each of the solenoids and one side of relay 56. The conductor 68 is connected through the normally-closed contacts of the microswitch 40 to the normally-open contacts 70 of relay 56. When these contacts of the relay are closed, voltage is supplied from conductor 68 to the other side of the relay, through a common conductor 71 connected to the solenoids and the relay. Conductor 68 is also connected through the normally-open contacts of a momentary type switch 72 to conductor 71.

In operation of the synchronizing apparatus of the invention, when the shaft 12 rotates the rotor 13 of the synchro generator, the rotors of the synchro generator and motor being energized through the normally-closed contacts 55 of relay 56, the rotation of the generator rotor causes rotation of the motor rotor because of the voltage developed by the generator stator and supplied to the motor stator (not shown). The motor may preliminarily lock in at some point other than the appropriate point. In order to insure locking-in at the appropriate point, the switch 72 is operated to supply operating voltage for solenoids 33 and 60 and the relay 56. When relay 56 is energized, the normally-closed contacts 55 thereof are opened, but the normally-open contacts 70 are closed. At the same time, the solenoid 60 causes the micro switch 54 to open its normally-closed contacts and close its normally-open contacts. In this manner, operating voltage is still supplied to both of the rotors. A holding circuit for the relay and the solenoids is then established by the contacts of microswitch 40 and the now-closed contacts 70 of the relay, so the switch 72 may be released. The switch 72 is not released until projection 61 on arm 58 fails into detent 62 of cam 63.

As the motor rotor sweeps around, the detent 62 of the cam 63 allows the projection 61 of arm 58 to fall into the detent, so causing the arm 58 to rotate slightly in counter-clockwise direction. This movement causes the microswitch 54 to move to its normal position, reopening the normally-open contacts. The connection of conductor 52 to common conductor 53 of the rotors is thereby interrupted, so that energizing voltage is no longer supplied for the rotors. The receiver stops rotating at this time, but the transmitter rotor continues to rotate by virtue of the direct drive from the rotating shaft 12 of the forming machine. When the projection 34 of cam 30 strikes the cam follower portion of arm 31, the microswitch 40 is opened, so that the holding circuit for the relay and the solenoids is interrupted, and the relay and the solenoids are de-actuated. The transmitter and receiver are then in phase, and connection of conductor 52 to conductor 53 of the rotors is again completed through the normally-closed contacts 55 of the relay, the rotors are again supplied with voltage, and the receiver again rotates with the transmitter.

Figure 6:
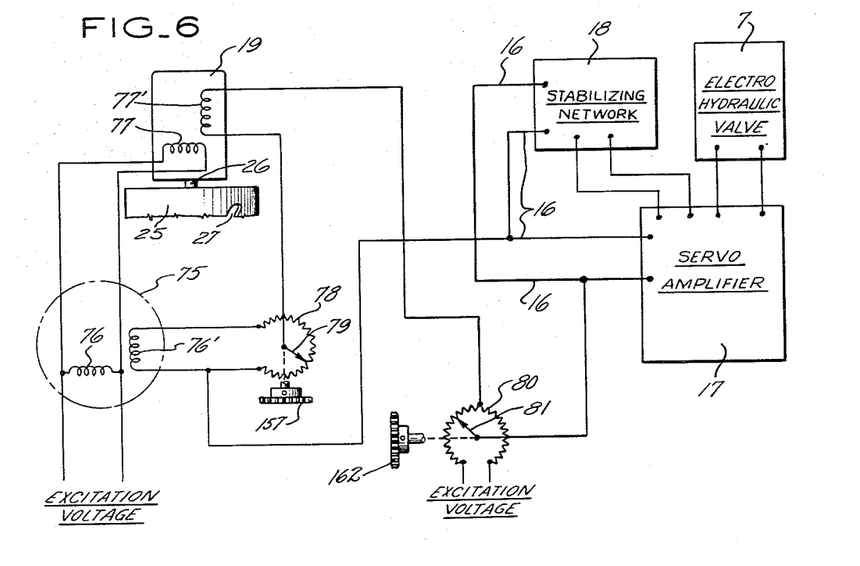
Fig. 6 is a schematic and diagrammatic view of the electrical system for driving the plunger.

Referring now to Fig. 6, the syncro motor 50 rotates the rotor of a rotary transducer 75 through mechanism to be described. The transducer 75, as well as the transducer 19, may be of the synchro type including a stator supplied with excitation voltage of appropriate amplitude and frequency, and a rotor winding inductively related to the stator winding and of appropriate configuration so as to generate an output voltage of the rotor which varies in suitable fashion in accordance with the angular position of the shaft of the transducer. In Fig. 6 the stator windings of the transducers 75 and 19 are labeled 76 and 77, respectively. The rotor windings are labeled 76' and 77', respectively. The output voltage of transducer 75 is developed across an adjustable potentiometer 78, whose wiper 79 is connected to one side of the rotor 77' of transducer 19 so that an appropriate portion of the output voltage of the transducer 75 is selected by the position of the potentiometer wiper. The potentiometer 78 thereby acts as a means for comparing the amplitude of the output voltage of transducer 75 and of transducer 19. The difference voltage between the outputs of the two transducers is supplied to the servo amplifier 17.

Another voltage, of appropriate level to determine the bias point for the servo amplifier, is supplied from a potentiometer 80 whose wiper 81 is connected to one side of the input of the servo amplifier. The potentiometer 80 is supplied with excitation voltage from an appropriate source (not shown). A stabilizing network 18 is provided to stabilize the system in known manner, so that the input of the servo amplifier will be properly regulated. As has been explained in conjunction with Fig. 1, the output of the servo amplifier controls the position of a suitable hydraulic valve 7.

Figure 7:
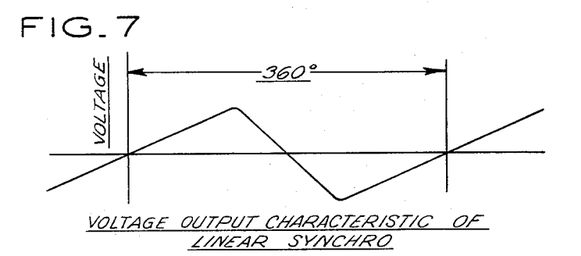
Fig. 7 is a graph of the voltage output vs. rotational position of the synchro used as the electromechanical transducer of the apparatus.

Referring next to Fig. 7, the graph of this figure shows the output voltage or waveshape characteristic of the transducers of Fig. 6. As will be noted, the waveshape varies in sawtooth form during the rotation of the transducer, with the voltage rising more slowly than it decreases, with respect to the reference line. This is the type of characteristic which is obtained from a certain commercially-available synchro called a "Linear Synchro," or "induction potentiometer."

It is not necessary that this particular type of transducer be used, or even that a synchro transducer be employed. Actually, any electromechanical transducer which has at least a pair of parts, with one part movable with respect to the other, and which develops a voltage having a characteristic wave shape which varies with respect to the relative positions of the parts, may be employed for the apparatus of the present invention. However, it will be noted from Fig. 7 that the waveshape of the linear synchro described herein is generally similar to the outline or configuration of the type of cam that is used with glass feeding machinery. Therefore, it is preferred that a transducer that produces this type of waveshape be used with the apparatus of this invention.

A repetitive wave shape of the type shown in Fig. 7 will be obtained from the linear synchro of the apparatus if the rotor thereof is rotated at constant speed. However, in order to vary the configuration of the wave shape of Fig. 7 to simulate more closely the configuration of any desired cam, the present invention provides for variation of the speed of the rotor in proper manner.

Figure 8:
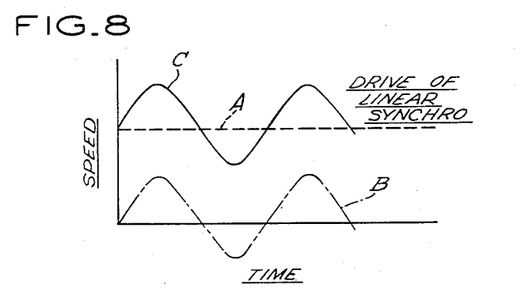
Fig. 8 is a graph of the variation in speed of drive of the transducer.

Referring to Fig. 8 showing a graph of the speed of drive of the transducer, with respect to time, the speed is shown as varying about a constant-speed line A, in accordance with a drive of harmonic wave form shown at B. Superposition of the drive B on the constant speed drive A results in a drive speed which varies according to the sine wave C.

Figure 9A:
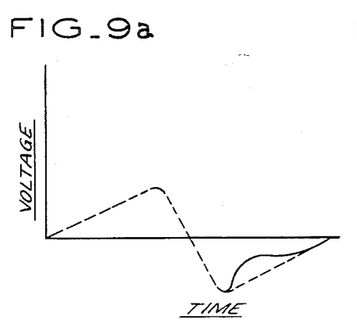
Figs. 9a–9c are graphs of various different types of output wave shapes that may be obtained from the transducer.
Figure 9B:
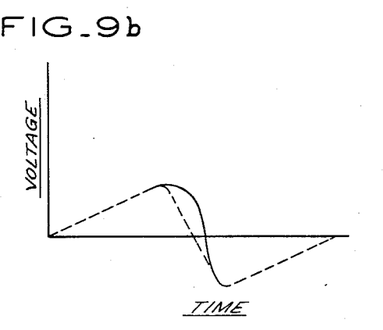
Figure 9C:
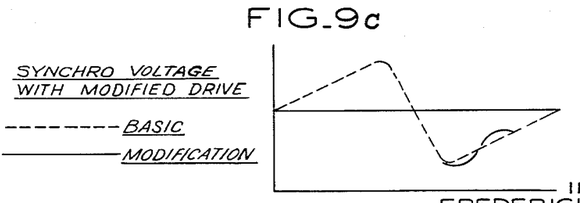

With proper and different variations of the speed of the rotor of the linear synchro, the wave shapes illustrated in Figs. 9a–9c may be obtained. The different shapes may be obtained by varying the phase of the harmonic motion with respect to the transducer. In these figures, the dashed lines are the output voltages of the synchro when the synchro is rotated at constant speed, while the solid lines indicate variations from the constant speed waveshapes obtained by variation of the speed of drive. As will be noted from the various figures, several different types of waveshapes can be obtained, and, as a matter of fact, an almost infinite number of different waveshapes can be obtained through the use of drive apparatus to be described. The various wave shapes can be utilized to simulate the contours of mechanical cams to control the motion of the feeder plunger during its stroke. By generating a signal which is proportional to the plunger position, comparing this signal with the desired voltage at that moment of time and feeding a signal equal to the difference between the two signals to the plunger actuating means the plunger motion can be controlled so as to vary in accordance with the contours of the desired wave shape. This results from the comparison of the two transducer signals since any discrepancy between the contour of the desired wave shape and the plunger motion results in the feeding of a correction signal to the plunger control mechanism.

Figures 10, 11, 12, 13:
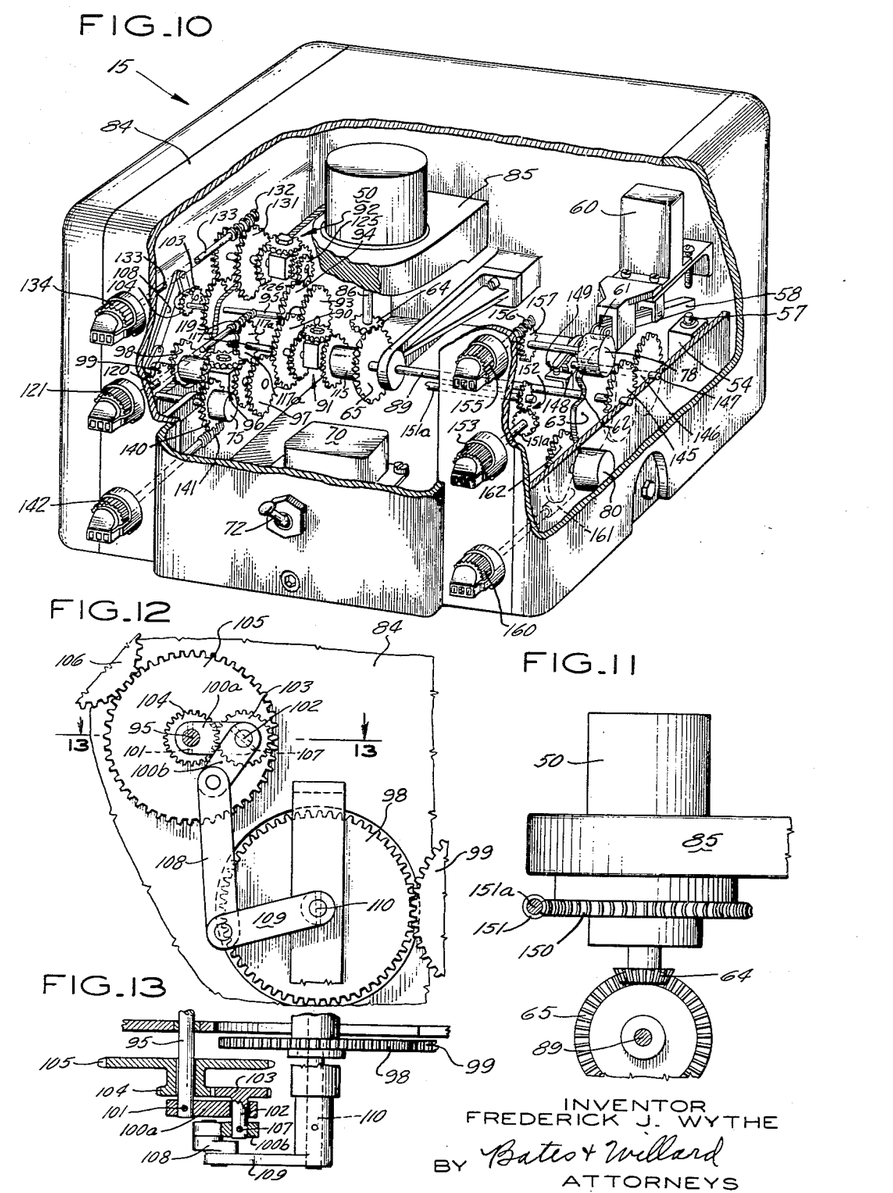
Fig. 10 is a perspective view of one form of the mechanism box of the apparatus, with parts broken away to show the mechanical drive of the transducer from the synchro receiver.
Fig. 11 is an enlarged side view of the synchro receiver of Fig. 10, together with its phasing means.
Fig. 12 is a side elevational view of a portion of the apparatus which provides for the harmonic speed variation of the transducer drive.
Fig. 13 is a sectional view taken along line 13—13 of Fig. 12.

Referring next to Fig. 10, the mechanism box 15 includes a casing 84 supporting a pedestal 85 which mounts the synchro motor 50. The rotor shaft 86 of the synchro motor carries the bevel gear 64 which drives the bevel gear 65 fixed to a main control shaft 89. Gear 65 drives a spur gear 90 through a differential 91. Spur gear 90 drives a second differential 92 through gear 93, shaft 95, gear 94 and gear 125, and also drives a differential 96 through a gear 97. The synchro transducer 75 is driven from differential 96 through an output gear 98 which drives gear 99 fixed to the shaft of the synchro.

As will be seen more clearly in Figs. 12 and 13, shaft 95, which is driven by gear 90 meshing with gear 93 fixed to the shaft, carries a link 100a which is fixed thereto by a pin 101 and which journals at its free end the shaft 102 of a small gear 103. Gear 103 meshes with another gear 104 of the same diameter, which is integral with a larger gear 105. Gears 104 and 105 are sleeved on shaft 95, so that they are free to rotate with respect thereto.

Gear 105 is driven from differential 92 through gear 106 meshing with gear 105. The gear-driving arrangements, or relationships, for gears 103 and 104 are identical, and the gear sizes are the same, so that gears 103 and 104 are driven at the same speed.

The shaft 102 of gear 103 is fixed to a second link 100b by a pin 107. The other end of link 100b is pivoted to a link 108 whose other end is pivoted to a second link 109. The other end of link 109 is fixed to a shaft 110. Shaft 110 is the second input to differential 96, so that the output of differential 96, which drives transducer 75, represents the sum of the constant speed drive furnished the differential from synchro motor 50 and the drive furnished the differential from the approximately harmonic motion device whose output is shaft 110.

In operation of the approximately harmonic motion described above, as shaft 95 is rotated, link 100a is rotated in such direction as to cause rotation of gear 103 counterclockwise, as shown in Fig. 12. Gear 103 thereby rotates around gear 104 in counterclockwise direction. However, the counterclockwise rotation which would normally be imparted to gear 103 about its own axis by virtue of its travel around the periphery of gear 104 is exactly counterbalanced by the rotation of gear 104 at the same speed. Thus, the resultant rotation imparted to gear 103 about its own axis is zero. As a result, there is no relative rotation of the link 100b with respect to link 100a, so that the angle between the links remains constant during the rotation of the links about the axis of shaft 95. The links thereby function as a bell crank lever. The rotation of this bell crank lever about shaft 95 causes a simple approximately harmonic oscillation of the shaft 110, thereby resulting in the superposition of an approximately harmonic oscillation upon the constant speed rotation imparted to the differential 96 from the synchro motor 50. The speed of rotation of the rotor of the transducer 75 is thereby caused to vary in harmonic form because of the approximately harmonic motion device. It will thus be seen that the apparatus just described constitutes a means for producing a variable motion, in this instance a hormonic motion, and for superimposing that motion on the constant speed drive of the transducer 75.

The amplitude of the approximately harmonic motion imparted to shaft 110 may be controlled by adjustment of the angle between links 100a and 100b. When the links are coincident, shaft 110 is given no oscillatory motion, while, when the links are 180° apart, so that they form a straight line, a maximum amplitude of oscillatory motion is given the shaft.

Figure 14:
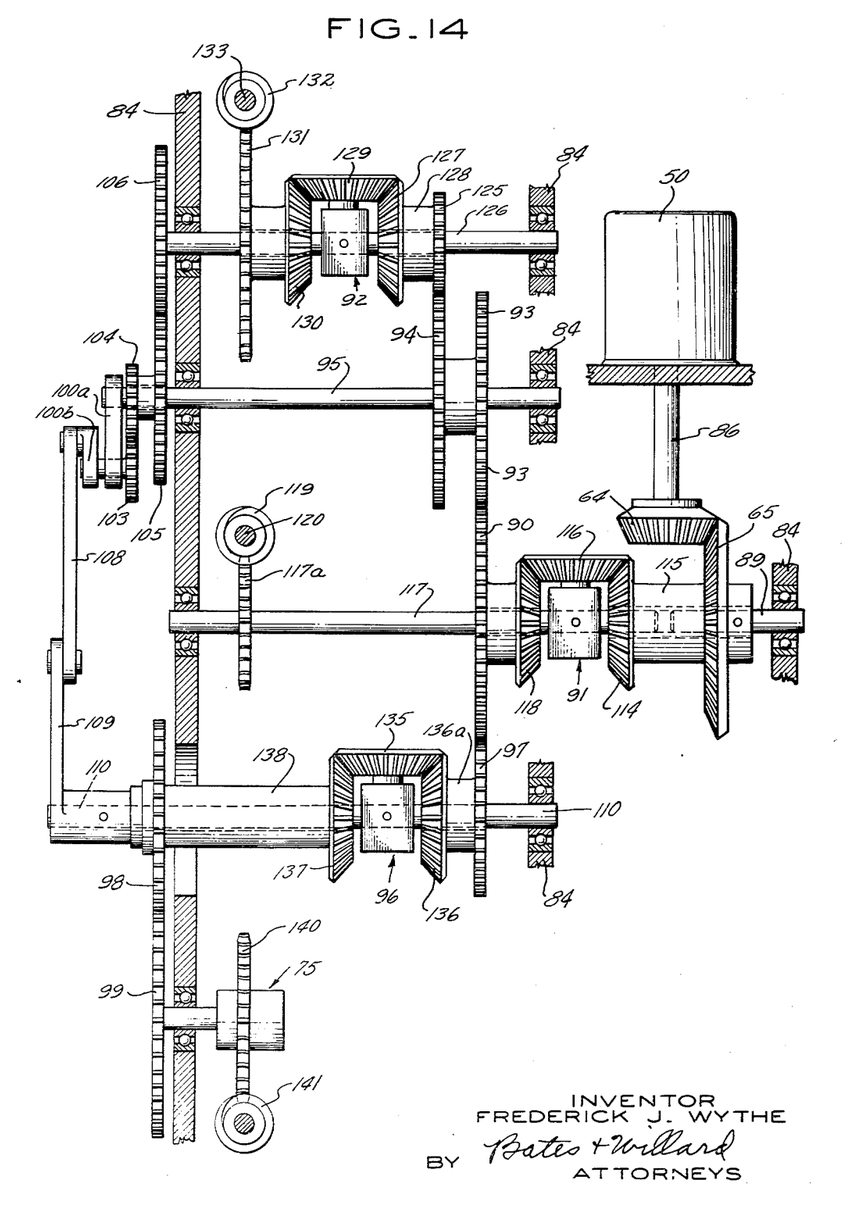
Fig. 14 is a diagrammatic view of the gear relationship of the transducer driving parts of Fig. 10.

This amplitude adjustment of the approximately harmonic motion device, as well as the other adjustments possible with the above apparatus, may be described more fully in conjunction with Fig. 14. Referring to that figure, the differential 91 includes a bevel pinion 114 which is fixed to a sleeve 115 to which gear 65 is also fixed. Pinion 114 meshes with a spider pinion 116 whose angular position with respect to the axis of rotation of pinion 114 is controlled by a spider shaft 117. The spider pinion meshes with a bevel pinion 118, furnishing the output of the differential. The pinion 114 and the spider pinion 116 furnish the two inputs to the differential.

Spider shaft 117 carries a worm gear 117a whose angular position is controlled by a worm 119 carried by a shaft 120. Shaft 120 extends through the front portion of the case and has a control knob 121 outside of the case, Fig. 10. Adjustment of knob 121 thereby causes adjustment of the approximately harmonic motion device and the transducer with respect to main control shaft 89, since the output of differential 91 is supplied to both of these devices. This adjustment provides for timing of the plunger movement with respect to movement of the shears of the feeder since rotation of the gear 117ª moves gears 118 and 90 relative to gear 114 and main control shaft 89. In this way the phase relationship of the harmonic motion generating apparatus and transducer 75 with respect to shaft 89 can be varied. No variation is introduced between the harmonic motion generating apparatus and the transducer since gear 90 will introduce the same phase shift into each.

As indicated above, the output gear 90 of differential 91 also rotates differential 92. This is accomplished through meshing of gear 93 with gear 90, gear 93 being fixed to shaft 95. Gear 94, which is sleeved to gear 93, meshes with the gear 125 rotatable about shaft 126. Gear 125 and input bevel pinion 127 of differential 92 are fixed to the same sleeve 128. Bevel pinion 127 meshes with bevel spider pinion 129, and the spider pinion meshes with bevel pinion 130.

In this differential, the output is the rotation of the spider shaft 126, which causes rotation of gear 106. The rotational position of bevel pinion 130, furnishing the second input to the differential 92, is controlled by a worm gear 131 which is sleeved to pinion 130. The angular position of worm gear 131 is controlled by worm 132 which is fixed to shaft 133. The angular position of shaft 133 is controlled by a control knob 134 outside of the case, Fig. 10. Rotation of the control knob 134 causes movement of the spider shaft 126, and hence rotation of gear 104. This rotation results in change in the relative angular positions of links 100a and 100b, thereby causing change in the amplitude of the harmonic oscillatory motion of the shaft 110 of the approximately harmonic motion device.

As indicated above, shaft 110 furnishes one input to differential 96. The shaft 110 is the spider shaft for the differential and controls the angular position of spider pinion 135. The spider pinion meshes with bevel pinions 136 and 137, the former furnishing the other input for the differential, and the latter furnishing the output. Pinion 136 is fixed to a sleeve 136a which carries gear 97, the latter being driven by input gear 90. The output pinion 137 is fixed to a sleeve 138 which carries gear 98. As indicated above, pinion 137 and gear 98, and pinion 136 and gear 97, are rotatable with respect to spider shaft 110. This arrangement enables the approximately harmonic oscillatory motion of shaft 110 to be added to the constant speed rotation of gear 97, so that the rotor of synchro transducer 75 is rotated at varying speed.

Another adjustment permitted by the apparatus of Figs. 10 and 14 is of the relative angular position of the transducer stator and rotor. This adjustment is accomplished by rotation of the stator of the transducer through a worm gear 140 fixed to the stator and controlled by a worm 141 which extends outside of the case and carries a control knob 142, Fig. 10. Rotation of control knob 142 causes a change in the relative positions of the stator and rotor of the synchro transducer, thus resulting in a change in the phase relation between the modulating motion and the fundamental function of the transducer.

Referring again to Fig. 10, the main control shaft 89 which is rotated by the synchro receiver 50 carries a gear 145 which meshes with a gear 146 carried by a stub shaft 147. Stub shaft 147 carries a cam 148 having a single operating projection which is designed to control a switch 149. Switch 149 is connected to the electrohydraulic shear mechanism S and controls its operation in such fashion that every time switch 149 is opened by cam 148 the shear blades 6—6 are caused to move toward each other and to sever a gob or mold charge from a mold charge mass of molten glass in suspension from the feeder outlet passage orifice 3.

The timing of the shear operation with respect to the operation of the forming machine can be controlled by adjustment of the position of the synchro motor 50 with respect to the mounting 85. This adjustment is accomplished through a worm gear 150 (Fig. 11) mounted on the casing of the synchro receiver and whose position is controlled by a worm 151. Worm 151 has its position controlled through a worm shaft 151a, a bevel gear arrangement 152, Fig. 10, and a control knob 153 outside of the box. Rotation of knob 153 thereby controls the position of synchro motor 50 in the mounting 85 since variation of the phase relation of the motor 50 with respect to the generator 13 will vary the phase relationship of the plunger and the shear mechanism control with respect to the forming machine.

There are two other adjustments possible with the apparatus of Fig. 10, those being of the potentiometers shown in Fig. 6. The potentiometer 78, across which the transducer voltage is developed, has a wiper 79 whose rotational position is controlled by a knob 155 which controls the position of a worm 156 meshing with worm gear 157, the latter being attached to the wiper of the potentiometer.

Potentiometer 80, across which the excitation voltage is supplied, has its wiper 81 adjusted to control the amount of bias furnished the system through a control knob 160 which rotates a worm 161 meshing with a worm gear 162. Worm gear 162 controls the position of wiper 81. This latter adjustment permits adjustment of the "plunger height," while the former adjustment (potentiometer 78) permits adjustment of the strokes of the plunger.

When the forming machine is operating to rotate shaft 12, the synchro transmitter or generator 13 is rotated thereby, and the synchronizing apparatus described above (Fig. 5) causes synchronization of the motor 50 with the generator 13. Rotation of the motor 50 results in rotation of main control shaft 89 (Fig. 10), and this rotation results in operation of the shear timing switch 149 once during each cycle of the apparatus, or each rotation of main control shaft 89, and rotation of transducer 75 through a complete cycle or sawtooth waveform, with the waveform of the transducer output being determined by the various adjustments provided. This wave form controls the motion of the feed plunger since the plunger motion is proportional to the amplitude of the voltage wave shape. Adjustment of the potentiometer 78 controls the length of the plunger stroke since this adjustment varies the slope of the basic wave shape. Adjustment of the potentiometer 80 controls the height of the point about which the plunger reciprocates by introducing a bias voltage into the system which acts as a reference voltage for the output voltages of the transducing means. The amplitude of the oscillatory or harmonic motion component of the rotation of the transducer is adjusted by knob 134. The timing of the plunger operation, or the relative time of the simulated cam with respect to the operation of the shear, is controlled by knob 121. The phase relation between the modulating motion and the fundamental function of the transducer is controlled by knob 142 which adjusts the stator of the transducer with respect to the rotor. It will be evident that all of these changes can be made during operation of the apparatus, if desired, and very quickly, without the necessity to change cams.

As indicated at the beginning of this specification, though the apparatus is designed particularly for use in glass feeding operation, the cam-simulating apparatus of the invention is not restricted to such use. As also indicated in the specification, the transducer employed need not be of any particular type, such as the linear synchro described, and it need not be a rotary transducer. As a matter of fact, the transducer can be any device which produces an electrical signal which varies with position of one part with respect to another and which signal can be made to repeat itself at periodic intervals. The output of this transducer then will produce a basic waveform which may be modified mechanically with a periodically-varying source.

The modifying motion supplied to the transducer may be any motion which is repetitious, and it does not need to be of simple form. For instance, a modifying motion including a harmonic movement and a dwell in each cycle of the transducer, could be used. The modifying motion must normally be such that within one period of operation of the apparatus the net modifying movement must be zero. In other words, applying this requirement to the apparatus of the drawings, the number of degrees of clockwise rotation of the shaft 110 in any one cycle of the apparatus must equal the number of degrees of counterclockwise rotation. It is also possible that the modifying motion be obtained from an entirely different type of apparatus than the approximately harmonic motion linkage described herein. As a matter of fact, even a three-dimensional cam could be used.

Figure 15:
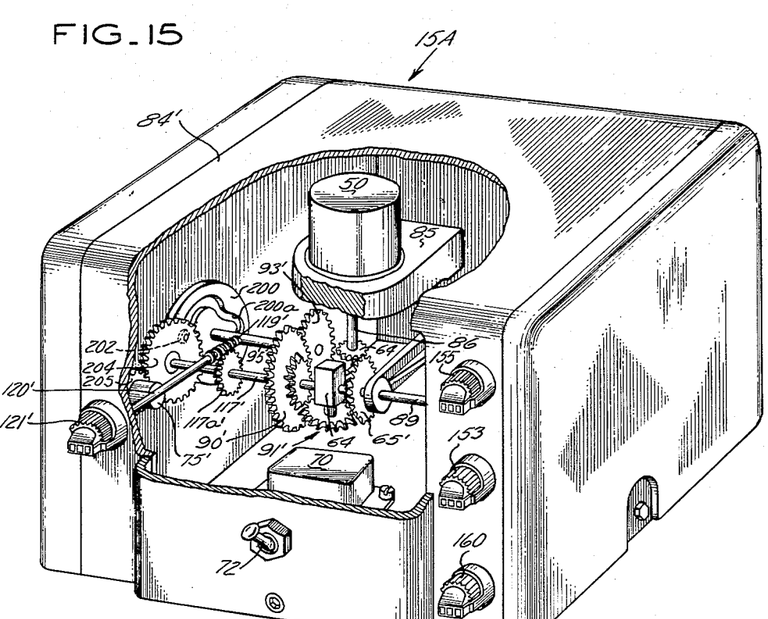
Fig. 15 is a perspective view, with parts broken away, of a second form of the mechanism box in which a cam is employed instead of cam-simulating provisions of the mechanism box of Fig. 10.

In the form of mechanism box shown in Fig. 15 where it is designated 15A, the drive from the synchro receiver to the voltage output transducer is modified to include an actual cam and cooperating elements instead of the cam simulating provisions of the Fig. 10 form.

Figures 16, 17:
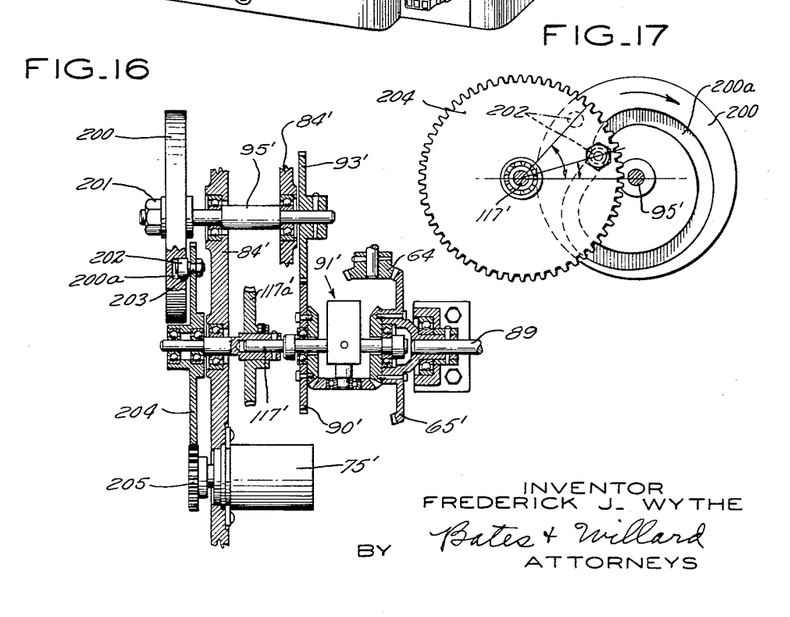
Fig. 16 is a relatively enlarged fragmentary view, partly in elevation and partly in vertical section, showing details of the drive of the transducer of the mechanism box of Fig. 15.
Fig. 17 is a face view of the cam and an associated gear of the drive mechanism of Figs. 15 and 16, showing the manner in which the gear is oscillated about its axis by rotation of the cam.

As shown in Fig. 15, the synchro receiver 50 directly drives the bevel pinion 64 as in the first form of the device. Pinion 64 drives a bevel gear 65' which, as is clear from Fig. 16, is fixed to the shaft 89. The parts which are located in the right hand portion of the housing 84' of this second form of mechanism box are not shown and need not be further referred to since they may be the same, and function in the same manner, as parts of the first form of mechanism box as shown in Fig. 10 and as have hereinbefore been particularly described.

The bevel gear 65' drives a spur gear 90' through a differential 91', Figs. 15 and 16. Gear 90' meshes with a gear 93' which is fixed to a shaft 95'. Shaft 95' carries a cam 200 which is removably fixed thereto, as at 201, Fig. 16. Cam 200 has a cam track 200a, Figs. 15, 16 and 17, which in the example shown is provided in a face of the cam and has a contour appropriate for the feeder plunger motion desired. A cam follower in the form of a roller 202 on a pin 203 projecting from the proximate face of a spur gear 204 rides in the cam track so as to be movable vertically between the two dotted line positions thereof in Fig. 17 as the cam rotates in a clockwise direction as indicated in the same view. Gear 204 is mounted to turn freely about the axis of a shaft 117' which is the spider pinion shaft of the differential 91'. Gear 204 meshes with a gear 205 which is fixed to the shaft of the voltage output transducer which is designated 75'.

In this form of mechanism box, each cycle of rotation of the cam 200 about the axis of its shaft will effect a cycle of oscillation of the gear 204 and consequently of the rotor of the transducer 75' with respect to its stator. Repeated such cycles of oscillation as the cam continues to rotate will produce a voltage output from the transducer of a wave shape corresponding to the contour of the cam track which in turn is appropriate for the pattern of feeder plunger motion desired. To change this pattern it is only necessary to change the cam which can be conveniently and quickly accomplished. By manipulating the control knob 121', Fig. 15, and thereby the worm shaft 120', worm 119', worm gear 117a' and spider shaft 117' of the differential 91', the phase relation between the cycles of desired feeder plunger motions and the periodic glass charge cutting operations of the feeder shear blades can be adjusted and predetermined.

The operation of the second form of mechanism box in cooperation with the other parts of the feeder operating mechanism as hereinbefore described will be substantially the same as has been explained with reference to the first form and will be productive of the same advantages except, of course, an interchange of cams is required to change the pattern of the feeder plunger motion desired. Various other forms of the mechanism box and modifications of the particular examples which have been shown and described will now be obvious to or readily occur to those skilled in the art as will various modifications of the embodiment of the feeder operating means of the present specification and accompanying drawings. Numerous changes can be made without departing from the spirit and scope of the invention.

I claim:

1. In a molten glass feeder, the combination of a feeder plunger, electrically responsive actuating means operable to vertically reciprocate the plunger, means for generating an electrical signal corresponding to a desired plunger motion, means coupled to the plunger to generate a second electrical signal proportional to the plunger position, and means electrically connected to said signal generating means to compare said electrical signals and to feed a signal representing the difference between them to said electrically responsive means to effect reciprocation of the plunger.

2. In a molten glass feeder, the combination of a feeder plunger, an electro-hydraulic mechanism operable in response to an electrical signal to vertically reciprocate the plunger, means to produce a basic electrical signal corresponding to a desired plunger motion and equivalent at any given instant to a desired plunger position, a plunger position sensing means coupled to the plunger to produce a feed-back electrical signal having a wave shape which will vary in amplitude the same as the plunger motion and at any given instant will be equivalent to the actual plunger position, means electrically connected to said signal producing means to compare said feed-back electrical signal with said basic electrical signal, and means to amplify and feed to the electro-hydraulic mechanism the error signal resulting from any difference between them to operate said electro-hydraulic mechanism to reciprocate said plunger.

3. In apparatus for feeding molten glass in mold charges to a forming machine, the combination of a vertically reciprocable feeder plunger, electrically responsive pressure fluid actuated means to reciprocate said plunger, electro-mechanical control means driven from the forming machine so as to be synchronized therewith and to produce a basic electrical signal corresponding to a desired plunger motion and equivalent at any given instant to the desired plunger position, a plunger position sensing means coupled to the plunger to produce a feed-back electrical signals which will vary in amplitude the same as the plunger motion and at any given instant will be equivalent to the actual plunger position, means electrically coupled to said signal producing means to compare said feed-back electrical signals, with said basic signals and means to amplify and feed to the electrically responsive pressure fluid actuated means the error signals resulting from the difference between said signals to operate said electrically responsive means to effect reciprocations of the plunger.

4. In a molten glass feeding apparatus, the combination of a feeder plunger, electrically-responsive means for reciprocating the plunger, means for controlling the electrically-responsive means said controlling means comprising electromechanical transducing means having one part movable with respect to another part, to generate an output voltage varying with relative position of said one part with respect to another part, means to effect cycles of movement of said one part relative to said another part and at speed varying in each cycle, other electromechanical transducer means mechanically coupled to the feeder plunger to supply feed-back output voltage proportional to the plunger position, and means to compare said output voltage of the first named transducing means and the feed-back output voltage of the second named transducing means and to supply the difference voltage to the electrically responsive means for reciprocating the feeder plunger.

5. In a molten glass feeding apparatus, the combination of a plunger and electrically-responsive means for reciprocating the plunger, means for controlling the electrically-responsive means said means comprising electromechanical transducing means having one part movable with respect to another part to generate an output voltage with a characteristic wave shape varying with relative position of said one part with respect to said another part, first means for moving said one part at a constant speed to cyclically vary its position with respect to said another part, second means for changing the speed of movement of said one part in each cycle in repetitive manner to modify the characteristic wave shape of the output voltage, a second electromechanical transducing means operatively coupled to the plunger to produce a feed-back output voltage proportional to the plunger position, and means to compare the modified output voltage of the first mentioned transducing means and said feed-back output voltage of the second transducing means and to amplify and supply the amplified difference voltage to the electrically-responsive means for reciprocating the plunger.

6. The apparatus of claim 5 in which said glass feeding apparatus further comprises a shear mechanism and electrically-responsive means for actuating the shear mechanism, and including a shaft and switch means operated once during each rotation of said shaft and connected to said shear actuating means to cause it to operate the shear mechanism each time the switch means is operated, said shaft being rotated by said first moving means.

7. Glass feeding apparatus for delivering molten glass from a source to a forming machine, said apparatus comprising a plunger, electrically-responsive means for reciprocating the plunger, a shear mechanism, and means for actuating the shear mechanism; means for controlling the electrically-responsive means and the shear actuating means said control means comprising a main control shaft, means for rotating said main control shaft at constant speed, means driven by said main control shaft for causing said shear actuating means to operate the shear mechanism periodically during rotation of the shaft, electromechanical transducing means having one part movable with respect to another part to generate an output voltage having a characteristic wave shape varying with the relative position of said one part to said another part, power transmission means for driving said one part including a differential, having one input coupled to the main control shaft so as to drive said one part cyclically in accordance with the speed of rotation of the main control shaft, variable motion producing means driven by said main control shaft coupled to a second input of said differential to generate a second driving motion operating to vary the speed of drive of said one part of the transducing means in repetitive fashion, a plunger position sensing transducing means coupled to the plunger to generate a feed-back output voltage, and means to compare the output voltages of the two transducing means and to amplify the resultant error signal and to supply the amplified signal to the means for reciprocating the plunger.

8. The apparatus of claim 7 in which said means for rotating said main control shaft comprises an output shaft constantly rotating at one speed, a synchro system linking said main control shaft and said output shaft said system comprising a generator driven by said output shaft at a rotational speed higher than that of the main control shaft, a motor electrically coupled to said generator and driving said main control shaft at a lower speed corresponding to the speed of said output shaft, and means for synchronizing said motor and said generator together said means comprising an electric circuit connecting the generator and the motor so as to supply said motor and said generator with energizing voltage, means for interrupting said circuit to de-energize said generator and said motor, first cam means driven by said motor operable to actuate the means for interrupting said circuit to de-energize said motor and generator to stop rotation of said motor, and second cam means driven by said output shaft operable to de-actuate the means for interrupting the circuit to re-energize said motor and said generator to start said motor rotating again.

9. In glass feeding apparatus, the combination of a plunger and electrically-responsive means for reciprocating the plunger, means for controlling the electrically-responsive means said controlling means comprising a main control shaft, means for rotating said main control shaft, electro-mechanical transducing means having one part rotatable with respect to another part to generate an output voltage having a wave shape varying with angular position of said one part with respect to said another part, means including differential gear means for driving said one part, said differential having two input gears and an output gear means for driving one input gear of the differential from said main control shaft at a speed proportional to the speed of the main control shaft, means driven by said main control shaft operable to supply the second input gear of the differential with an oscillating motion, the output gear of the differential being operable to rotate said one part of the transducing means, a plunger position sensing transducing means operatively coupled to the plunger to generate a feed-back voltage output varying with the position of the plunger, and means to compare the two voltage outputs and to amplify the resultant electrical error signal and to feed the amplified signal to the electrically responsive means for reciprocating the plunger.

10. In a glass feeding apparatus, the combination of a plunger and electrically-responsive means for reciprocating the plunger, means for controlling the electrically-responsive means, said controlling means comprising a main control shaft, means for rotating said main control shaft, electromechanical transducing means having one part rotatable with respect to another part to generate an output voltage having a wave shape varying with angular position of said one part with respect to said another part, means for driving said one part including a first gear differential having two input gears and an output gear, means for driving one input gear of the differential from said main control shaft at a speed proportional to the speed of said shaft, harmonic motion generating means coupled to the main control shaft for converting a said shaft rotation into oscillation of the second input gear of said first differential, a second differential having two input gears and an output gear one of said input gears being rotated by said main control shaft and the output gear being connected to said harmonic motion means to drive it, adjusting means operable to adjust the angular position of a second input gear of said second differential for controlling the amplitude of oscillation of said second input gear of the first differential, and means for supplying the output voltage of said transducing means to said electrically-responsive means.

11. The apparatus of claim 10 including adjusting means for changing the relative initial angular position of said one part with respect to said another part of the transducing means.

12. Glass feeding apparatus for delivering molten glass from a source to a forming machine, said apparatus comprising a plunger, electrically-responsive means for reciprocating the plunger, a shear mechanism, and electrically-responsive means for operating the shear mechanism; means for controlling the both of said electrically-responsive means, said controlling means comprising a main control shaft, means for rotating the main control shaft at constant speed, a cam driven by said main control shaft, a switch operable by said cam and connected to said shear operating means to cause the operation of the shear each time the switch is operated, electromechanical transducing means having one part rotatable with respect to another part to generate an output voltage having a wave shape periodically varying with angular position of said one part with respect to said another part, a gear differential having two input gears and an output gear one of said input gears being driven by said shaft and the output gear driving said one part of the transducing means, harmonic motion generating means driven by said main control shaft operable to oscillate a second input gear of the differential, and means for supplying the output voltage of said transducing means to said means for reciprocating the plunger.

13. The apparatus of claim 12 including a second gear differential having two input gears and an output gear one of said input gears being driven by said main control shaft and the output gear driving said second input gear of the first-mentioned differential and said harmonic motion generating means, adjustment means coupled to the second input gear of the second differential for adjusting the angular position of the output gear thereof with respect to the angular position of the shaft.

14. Glass feeding apparatus for delivering molten glass from a source to a forming machine, said apparatus comprising a plunger, electrically-responsive means for reciprocating the plunger, a shear mechanism, and electrically-responsive means for operating the shear mechanism; means for controlling both of said electrically-responsive means said controlling means comprising a main control shaft, means for rotating the main control shaft at constant speed, a cam driven by said main control shaft, a switch operable by said cam and connected to said shear operating means to cause it to operate the shear each time the switch is operated, electromechanical transducing means having one part rotatable with respect to another part to generate an output voltage having a wave shape periodically varying with angular position of said one part with respect to said another part, a gear differential having two input gears and an output gear one of said input gears being driven by said main control shaft and the output gear driving said one part of the transducing means, a second shaft, a bell crank lever having one of its ends fixed to said second shaft, means connecting the other end of the bell crank lever to the second input gear of said differential to cause it to oscillate when said second shaft is rotated, means coupling said main control shaft to said second shaft to cause them to rotate together, and means for supplying the output voltage of said transducing means to said means for reciprocating the plunger.

15. The apparatus of claim 14 including means for changing the angle between the arms of said bell crank lever to change the amplitude of oscillating motion of said second input gear of the differential.

16. The apparatus of claim 14 in which said bell crank lever comprises a pair of links, first and second intermeshing gears said first gear having a shaft, one link being fixed at one end of said second shaft and having its other end mounted on the shaft of said first gear for rotation with respect to said second shaft, the shaft of said first gear being fixed to one end of the other link, a third shaft coupled to said second shaft for rotation therewith and coupled to said second gear to rotate said second gear at the same angular speed as the rotation of said second shaft.

17. The apparatus of claim 16 including a second gear differential having two input gears and an output gear one of said input gears being driven by said second shaft and the output gear driving said third shaft, and adjustment means for changing the angle between said pair of links to change the amplitude of oscillating motion of the second input gear of the differential, said adjustment means being operable to vary the angular position of a second input gear of said second differential.

References Cited in the file of this patent

UNITED STATES PATENTS

| | | |
|---|---|---|
| 1,941,552 | Henry et al. | Jan. 2, 1934 |
| 2,010,777 | Grotta | Aug. 6, 1935 |
| 2,234,349 | MacKay | Mar. 11, 1941 |
| 2,246,461 | Cannon | June 17, 1941 |
| 2,306,789 | McMamara | Dec. 29, 1942 |
| 2,390,463 | Roters | Dec. 4, 1945 |